(12) United States Patent
Zhang et al.

(10) Patent No.: US 11,403,026 B2
(45) Date of Patent: Aug. 2, 2022

(54) METHOD, DEVICE AND COMPUTER PROGRAM PRODUCT FOR MANAGING STORAGE SYSTEM

(71) Applicant: EMC IP Holding Company LLC, Hopkinton, MA (US)

(72) Inventors: Yue Zhang, Beijing (CN); Jianbin Kang, Beijing (CN); Hongpo Gao, Beijing (CN); Jibing Dong, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/186,426

(22) Filed: Feb. 26, 2021

(65) Prior Publication Data

US 2022/0147260 A1 May 12, 2022

(30) Foreign Application Priority Data

Nov. 6, 2020 (CN) .......................... 202011229505.7

(51) Int. Cl.
*G06F 3/06* (2006.01)
*G06F 12/00* (2006.01)
*G06F 13/00* (2006.01)

(52) U.S. Cl.
CPC .......... *G06F 3/0647* (2013.01); *G06F 3/0619* (2013.01); *G06F 3/0629* (2013.01); *G06F 3/0659* (2013.01); *G06F 3/0683* (2013.01)

(58) Field of Classification Search
CPC .. G06F 3/0481; G06F 3/165; G06F 16/90335; G06F 21/606; G06F 3/017; G06F 3/0418
USPC .................................................. 711/154
See application file for complete search history.

(56) References Cited

U.S. PATENT DOCUMENTS

| | | | |
|---|---|---|---|
| 5,832,522 A * | 11/1998 | Blickenstaff | G06F 3/0647 |
| 6,101,585 A * | 8/2000 | Brown | G06F 11/1451 |
| | | | 707/999.204 |
| 6,594,744 B1 * | 7/2003 | Humlicek | G06F 3/0601 |
| | | | 714/766 |
| 6,771,703 B1 | 8/2004 | Oguz et al. | |
| 6,871,006 B1 | 3/2005 | Oguz et al. | |
| 6,959,116 B2 | 10/2005 | Sezer et al. | |
| 6,976,134 B1 | 12/2005 | Lolayekar et al. | |
| 7,080,225 B1 * | 7/2006 | Todd | G06F 3/061 |
| | | | 711/6 |

(Continued)

*Primary Examiner* — Mohamed M Gebril
(74) *Attorney, Agent, or Firm* — BainwoodHuang (57) ABSTRACT

Techniques for managing a storage unit involve: determining space usage indicators of a storage system including disks, each disk is divided into disk slices, and at least part of the disk slices are organized into a storage unit. The techniques further involve: determining a target priority of a data migration task based on the space usage indicators, wherein the data migration task is used to migrate data in a group of disk slices allocated to at least one storage unit to another group of disk slices. The techniques further involve: if the target priority is different from a current priority of the data migration task, adjusting the current priority of the data migration task to the target priority, and determining system resources for the data migration task based on the target priority. Accordingly, a priority of a data migration task can be dynamically adjusted to accommodate different scenarios.

20 Claims, 6 Drawing Sheets

(56) References Cited

U.S. PATENT DOCUMENTS

| | | |
|---|---|---|
| 7,421,509 B2 | 9/2008 | Lolayekar et al. |
| 7,539,824 B2 | 5/2009 | Lolayekar et al. |
| 7,773,521 B2 | 8/2010 | Zhang et al. |
| 8,327,103 B1 | 12/2012 | Can et al. |
| 8,756,386 B2* | 6/2014 | Tokoro ............... G06F 11/1456 711/170 |
| 8,909,829 B1 | 12/2014 | Thangapalam et al. |
| 9,645,761 B1* | 5/2017 | Ben Dayan ............ H04L 49/90 |
| 9,830,111 B1* | 11/2017 | Patiejunas ............ G06F 3/0625 |
| 9,940,073 B1 | 4/2018 | Thangapalam et al. |
| 10,025,518 B1 | 7/2018 | Totappanavar et al. |
| 10,225,162 B1 | 3/2019 | Jain et al. |
| 11,132,332 B2* | 9/2021 | Matsui ................... G06F 3/065 |
| 2009/0089343 A1* | 4/2009 | Moore .................. G06F 3/0608 |
| 2011/0161973 A1* | 6/2011 | Klots ...................... H04L 67/10 707/705 |
| 2012/0254882 A1* | 10/2012 | Makljenovic ............ G06F 9/54 718/103 |
| 2013/0042049 A1* | 2/2013 | Fiske ................. G06F 12/0246 711/E12.008 |
| 2013/0067148 A1* | 3/2013 | Takagi ................. G06F 3/0659 711/E12.008 |
| 2015/0189665 A1* | 7/2015 | Sun ....................... H04W 16/14 370/329 |
| 2018/0075053 A1* | 3/2018 | Karr ..................... G06F 3/0637 |
| 2018/0157532 A1* | 6/2018 | Kumar ................. G06F 9/4881 |

* cited by examiner

| First space usage indicator | Second space usage indicator | Third space usage indicator | Target priority |
|---|---|---|---|
| Lower than a first threshold | Lower than a second threshold | Lower than a third threshold | Highest |
| Lower than a first threshold | Exceed the second threshold | Lower than a third threshold | Highest |
| Lower than a first threshold | Lower than a second threshold | Exceed the third threshold | Highest |
| Lower than a first threshold | Exceed the second threshold | Exceed the third threshold | High |
| Exceed the first threshold | Lower than a second threshold | Lower than a third threshold | Medium |
| Exceed the first threshold | Exceed the second threshold | Lower than a third threshold | Low |
| Exceed the first threshold | Lower than a second threshold | Exceed the third threshold | Low |
| Exceed the first threshold | Exceed the second threshold | Exceed the third threshold | Low |

FIG. 3

| Target priority | Number of processor cores | Number of sub-tasks that can be executed in parallel | Whether to allow data access |
|---|---|---|---|
| Low | 1 | 1 | Yes |
| Medium | 1 | 2 | Yes |
| High | 1 | 4 | No |
| Highest | 2 | 4 | No |

METHOD, DEVICE AND COMPUTER PROGRAM PRODUCT FOR MANAGING STORAGE SYSTEM

CROSS-REFERENCE TO RELATED APPLICATION

This application claims priority to Chinese Patent Application No. CN202011229505.7, on file at the China National Intellectual Property Administration (CNIPA), having a filing date of Nov. 6, 2020, and having "METHOD, DEVICE AND COMPUTER PROGRAM PRODUCT FOR MANAGING STORAGE SYSTEM" as a title, the contents and teachings of which are herein incorporated by reference in their entirety.

TECHNICAL FIELD

Embodiments of the present disclosure generally relate to the field of data storage, and in particular, to a method, an electronic device, and a computer program product for managing a storage system.

BACKGROUND

In a storage system including a plurality of physical disks, each physical disk may be divided into a plurality of disk slices, and the disk slices divided from the plurality of physical disks may be organized into storage units to provide services to upper-layer applications. When an available storage space in the storage system is insufficient, a new physical disk may be added to the storage system and a data migration task may be executed to migrate data in some disk slices to disk slices of the new physical disk. The execution of the data migration task enables the storage units to be evenly distributed in the plurality of physical disks to avoid the concentration of input/output (I/O) operations on several physical disks, thereby improving the access performance of the storage system.

SUMMARY OF THE INVENTION

The embodiments of the present disclosure provide a method, an electronic device, and a computer program product for managing a storage system.

In a first aspect of the present disclosure, a method for managing a storage unit is provided. The method includes: determining a plurality of space usage indicators of a storage system, where the storage system includes a plurality of disks, each disk is divided into a plurality of disk slices, and at least part of the disk slices in the plurality of disks are organized into a storage unit; determining a target priority of a data migration task based on the plurality of space usage indicators, where the data migration task is used to migrate data in a group of disk slices allocated to at least one storage unit to another group of disk slices; if the target priority is different from a current priority of the data migration task, adjusting the current priority of the data migration task to the target priority; and determining system resources for the data migration task based on the target priority.

In a second aspect of the present disclosure, an electronic device is provided. The electronic device includes at least one processing unit and at least one memory. The at least one memory is coupled to the at least one processing unit and stores instructions for execution by the at least one processing unit. The instructions, when executed by the at least one processing unit, cause an apparatus to perform actions including: determining a plurality of space usage indicators of a storage system, where the storage system includes a plurality of disks, each disk is divided into a plurality of disk slices, and at least part of the disk slices in the plurality of disks are organized into a storage unit; determining a target priority of a data migration task based on the plurality of space usage indicators, where the data migration task is used to migrate data in a group of disk slices allocated to at least one storage unit to another group of disk slices; if the target priority is different from a current priority of the data migration task, adjusting the current priority of the data migration task to the target priority; and determining system resources for the data migration task based on the target priority.

In a third aspect of the present disclosure, a computer program product is provided. The computer program product is tangibly stored in a non-transitory computer storage medium and includes machine-executable instructions. The machine-executable instructions, when executed by a device, cause this device to implement any step of the method described according to the first aspect of the present disclosure.

The Summary of the Invention section is provided in order to introduce the selection of concepts in a simplified form, which will be further described in the Detailed Description below. The Summary of the Invention section is not intended to identify key features or essential features of the present disclosure, nor is it intended to limit the scope of the present disclosure.

BRIEF DESCRIPTION OF THE DRAWINGS

The above and other objectives, features, and advantages of the present disclosure will become more apparent by describing the example embodiments of the present disclosure in more detail in combination with the accompanying drawings. In the example embodiments of the present disclosure, the same reference numerals generally represent the same parts.

In each figure, the same or corresponding reference numerals represent the same or corresponding parts.

DETAILED DESCRIPTION

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred embodiments of the present disclosure will be described in more detail below with reference to the accompanying drawings. Although the preferred embodiments of the present disclosure are shown in the accompanying drawings, it should be understood that the present disclosure can be implemented in various forms and should not be limited by the embodiments set forth herein. Rather, these embodiments are provided so that this disclosure will be more thorough and complete, and will fully convey the scope of the present disclosure to those skilled in the art.

As used herein, the term "including" and variations thereof mean open-ended inclusion, that is, "including but not limited to." Unless specifically stated, the term "or" means "and/or." The term "based on" means "based at least in part on." The terms "one example embodiment" and "one embodiment" mean "at least one example embodiment." The term "another embodiment" means "at least one further embodiment." The terms "first," "second," and the like may refer to different or identical objects. Other explicit and implicit definitions may also be included below.

As mentioned above, when the remaining storage space in a storage system is insufficient, a new physical disk may be added to the storage system and a data migration task may be executed to migrate data in some disk slices to disk slices of the new physical disk. The execution of the data migration task enables the storage units to be evenly distributed in the plurality of physical disks to avoid the concentration of I/O operations on several physical disks, thereby improving the access performance of the storage system.

A priority of the data migration task is closely related to its execution speed. When the priority of the data migration task is higher, the data migration task may occupy more system resources, so its execution speed is higher. This allows the new physical disk to be quickly put into use to alleviate the insufficiency of the storage space in the storage system. However, if the priority of the data migration task is too high, the performance of other normal data accesses to the storage system may be affected. When the priority of the data migration task is lower, the data migration task may occupy less system resources, so its execution speed is lower. In this case, the data migration task has less impact on other normal data accesses to the storage system. However, due to the low execution speed of the data migration task, the new physical disk cannot be put into use quickly. In some cases, the execution of the data migration task may not be completed before the remaining storage space of the storage system is exhausted, which will seriously affect the availability of the storage system.

Some conventional solutions set the priority of the data migration task to a fixed value between the highest priority and the lowest priority. Apparently, these solutions cannot well meet the requirements of different scenarios.

The embodiments of the present disclosure provide a solution for managing a storage system to solve one or more of the above problems and other potential problems. In this solution, a plurality of space usage indicators of a storage system are determined. A target priority of a data migration task is determined based on the plurality of space usage indicators. If the target priority is different from a current priority of the data migration task, the current priority of the data migration task is adjusted to the target priority, and system resources for the data migration task are determined based on the target priority. In this way, the embodiments of the present disclosure can dynamically adjust the priority of a data migration task to meet the requirements of different scenarios, thereby increasing the execution speed of adjusting the data migration task as much as possible without affecting a normal data access operation.

Hereinafter, the embodiments of the present disclosure will be further described in detail with reference to the accompanying drawings.

Figure 1A:
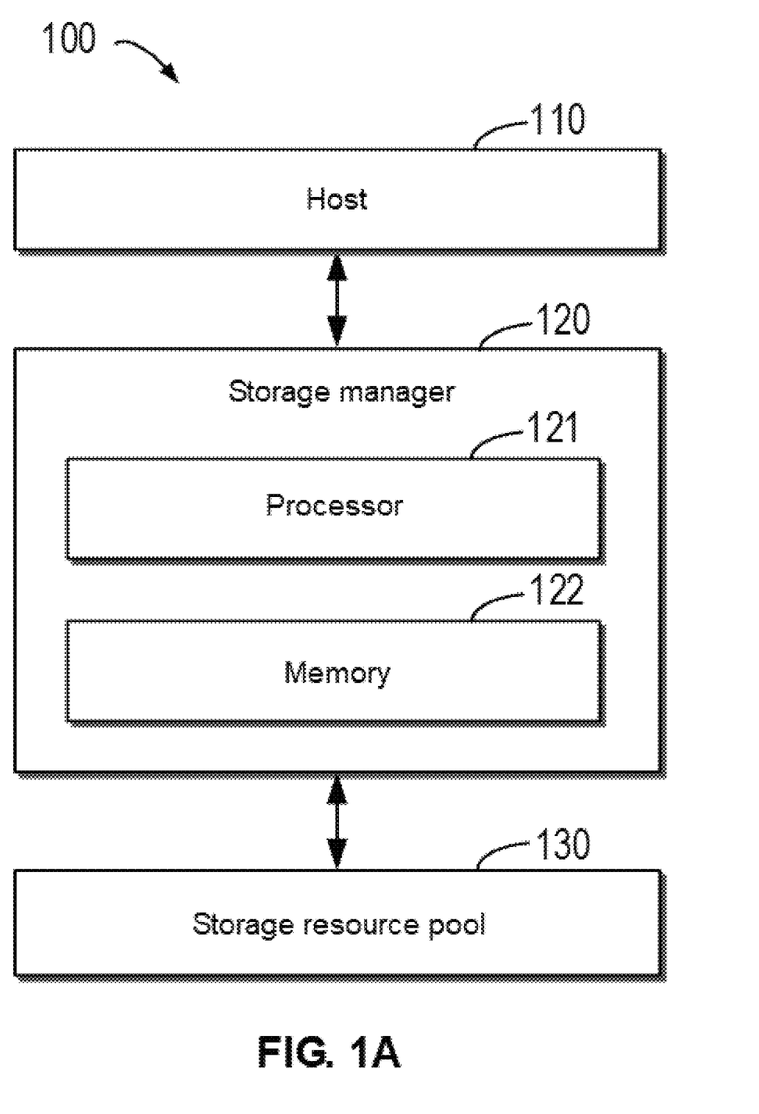
FIG. 1A shows a block diagram of an example storage system in which an embodiment of the present disclosure can be implemented.

FIG. 1A shows a block diagram of example storage system 100 in which an embodiment of the present disclosure can be implemented. As shown in FIG. 1A, storage system 100 includes host 110, storage manager 120, and storage resource pool 130. It should be understood that the structure and function of storage system 100 are described for illustrative purposes only, and do not imply any limitation to the scope of the present disclosure. For example, the embodiments of the present disclosure may also be applied to a storage system different from storage system 100.

Storage resource pool 130 may include one or more physical disks, for example, magnetic disks, optical disks, solid state disks (SSD), etc. Each physical disk may be divided into a plurality of disk slices. For example, each disk slice may have the same size. A plurality of disk slices distributed on one or more physical disks may be organized into storage units to store data. Storage manager 120 may include processor 121 and memory 122. Memory 122 may be any volatile storage medium or non-volatile storage medium that is currently known or to be developed in the future, or a combination of the two. Storage manager 120 may be configured to manage storage resource pool 130 and process I/O requests from host 110. Host 110 may be any physical computer, virtual machine, server, or the like where a user application is run.

Host 110 may send an I/O request to storage manager 120 to, for example, read data from a target storage unit in storage resource pool 130 and/or write data into the target storage unit, or the like. Metadata of the target storage unit may be stored in a metadata storage unit. In response to receiving the I/O request from host 110, storage manager 120 may firstly acquire the metadata of the target storage unit from the metadata storage unit, and the metadata may indicate mapping information from the target storage unit to the physical disk, etc. In response to the I/O request being a read request, storage manager 120 may forward the I/O request to the target storage unit based on the acquired metadata, so as to read data from the target storage unit, and return the read data to host 110. In response to the I/O request being a write request, storage manager 120 may forward the I/O request to the target storage unit based on the acquired metadata, so as to write data into the target storage unit.

Figure 1B:
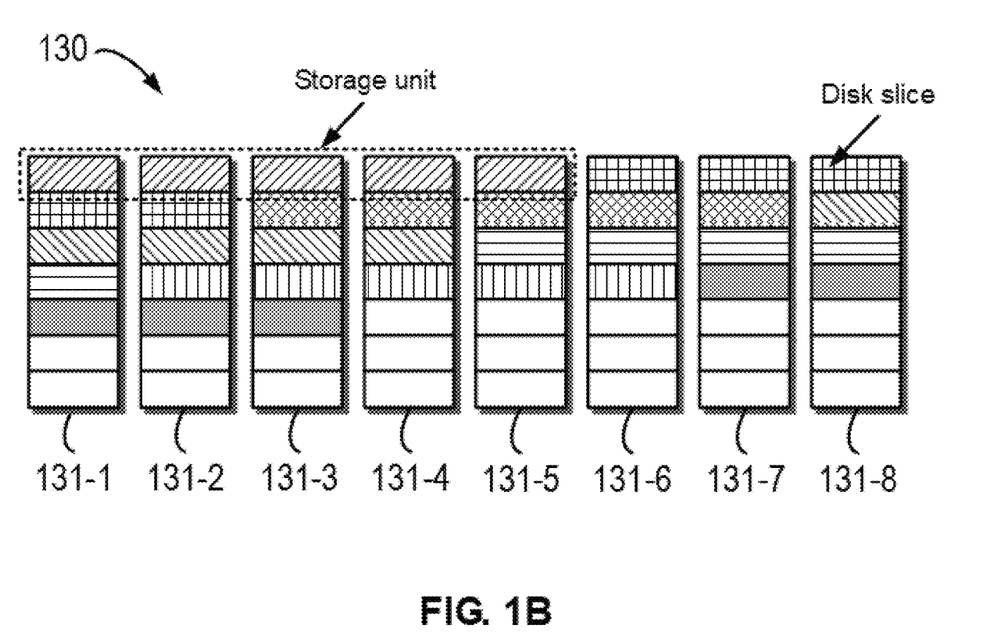
FIG. 1B shows a schematic diagram of an example storage resource pool according to an embodiment of the present disclosure.

FIG. 1B shows a schematic diagram of example storage resource pool 130 according to an embodiment of the present disclosure. As shown in FIG. 1B, persistent storage device 130 may include disks 131-1, 131-2, . . . , 131-8 (collectively referred to as "disk 131"). It should be understood that the number of disks 131 shown in FIG. 1B is shown for illustrative purposes only, and does not imply any limitation to the scope of the present disclosure.

As shown in FIG. 1B, each disk 131 may be divided into a plurality of disk slices (for example, each disk slice has the same size). The plurality of disk slices distributed on one or more disks 131 may be organized into storage units to, for example, provide the function of a redundant array of independent disks (RAID). In the example of FIG. 1B, the disk slices with the same filling pattern belong to the same storage unit, the disk slices with different filling patterns belong to different storage units, and the unfilled disk slices have not been used yet. According to different types of data stored, storage resource pool 130 may include various types of storage units, for example, a storage unit configured to store user data (also referred to as "user data storage unit"), a storage unit configured to store metadata of a plurality of storage units (also referred to as "metadata storage unit"), etc. Metadata of a storage unit may include mapping information of the storage unit to a physical disk (for example, indicating which disk slices of which physical disks are occupied by the storage unit), a state of the storage unit (for example, a normal state or a failed state), etc.

When an available storage space in storage resource pool 130 is insufficient, a user may add a new disk to storage resource pool 130, and storage manager 120 may execute a data migration task to migrate data in some disk slices to disk slices of the new disk, so that storage units are evenly distributed in a plurality of physical disks of storage resource pool 130. Storage manager 120 may set a priority of the data migration task and allocate system resources to the data migration task based on the priority.

Figure 2:
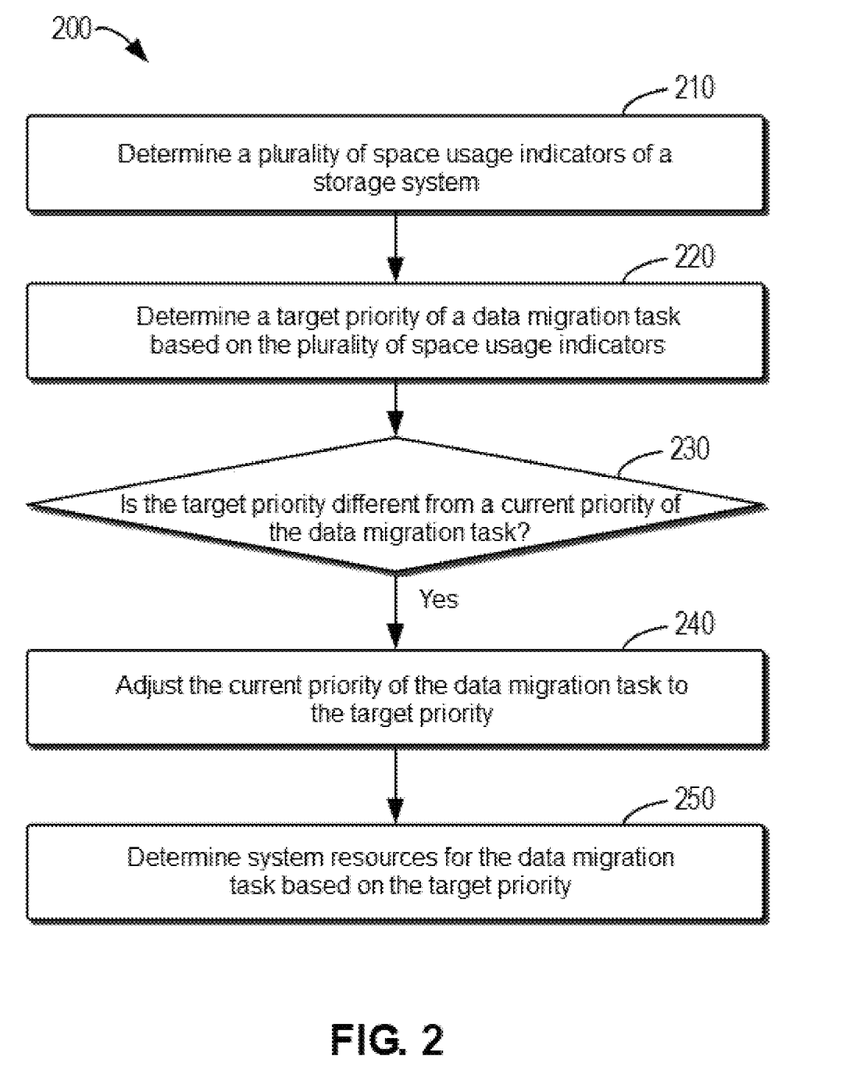
FIG. 2 shows a flowchart of an example method for managing a storage system according to an embodiment of the present disclosure.

FIG. 2 shows a flowchart of example method 200 for managing a storage system according to an embodiment of the present disclosure. Method 200 may be, for example, performed by storage manager 120 (for example, processor 121) as shown in FIG. 1. It should be understood that method 200 may also include additional actions not shown and/or omit actions shown, and the scope of the present disclosure is not limited in this regard. Method 200 is described in detail below with reference to FIG. 1.

As shown in FIG. 2, at block 210, storage manager 120 determines a plurality of space usage indicators of storage system 100.

In some embodiments, the plurality of space usage indicators may include a first space usage indicator, which indicates an available storage space size in the storage system that can be used to allocate new storage units. Taking FIG. 1B as an example, the first space usage indicator may indicate a storage space size corresponding to unfilled disk slices in FIG. 1B.

Additionally, in some embodiments, the plurality of space usage indicators may further include a second space usage indicator, which indicates the size of a free storage space (also referred to as "metadata free space") in a storage space allocated to a metadata storage unit. For example, the metadata free space may include an unused storage space and a recyclable storage space in the metadata storage unit, where the recyclable storage space refers to a storage space in which metadata has been deleted but not yet recycled.

Additionally, in some embodiments, the plurality of space usage indicators may further include a third space usage indicator, which indicates the size of a free storage space (also referred to as "user data free space") in a storage space allocated to a user data storage unit. For example, the user data free space may include an unused storage space in the user data storage unit.

It should be understood that the above space usage indicators are shown for illustrative purposes only. In other embodiments, the plurality of space usage indicators may further include other space usage indicators, or not include one or more of the above space usage indicators.

At block 220, storage manager 120 determines a target priority of a data migration task based on the plurality of space usage indicators.

Figure 3:
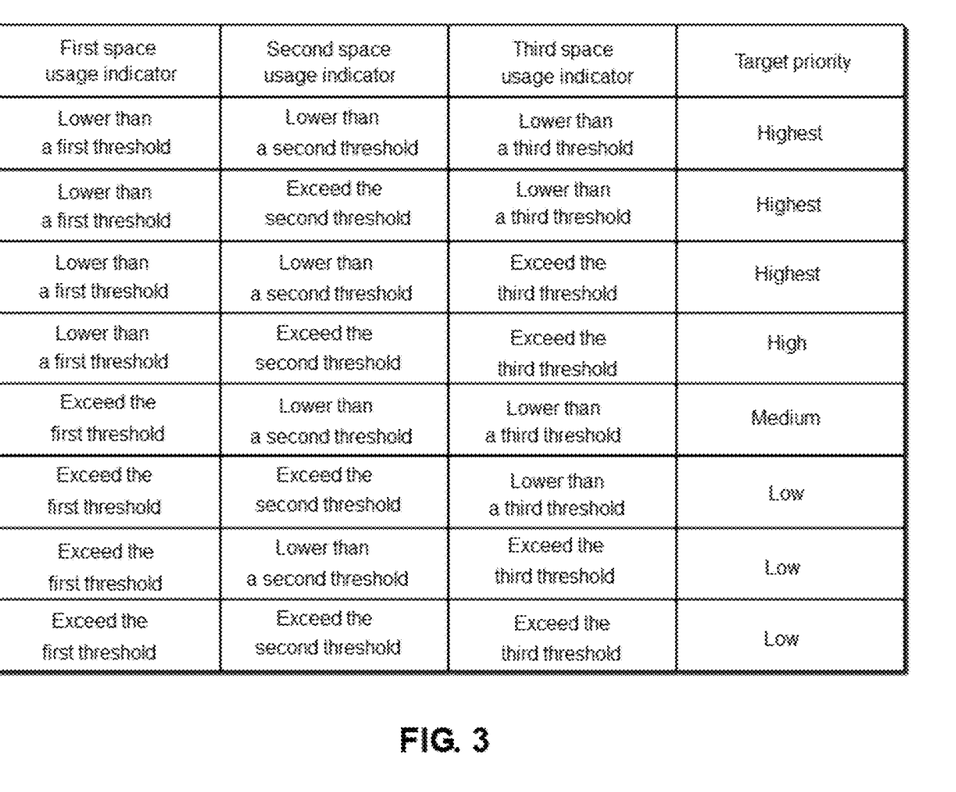
FIG. 3 shows a schematic diagram of determining a target priority of a data migration task based on a plurality of space usage indicators according to an embodiment of the present disclosure.

FIG. 3 shows a schematic diagram of determining a target priority of a data migration task based on a plurality of space usage indicators according to an embodiment of the present disclosure. For illustrative purposes rather than restrictive purposes, FIG. 3 shows an example of determining a target priority of a data migration task based on the above first space usage indicator, second space usage indicator, and third space usage indicator. It should be understood that when the space usage indicators determined by storage manager 120 are different, storage manager 120 may determine the target priority of the data migration task in a different manner from that shown in FIG. 3. The embodiments of the present disclosure are not limited in this respect.

As shown in FIG. 3, in some embodiments, if the first space usage indicator is lower than a first threshold and the second space usage indicator is lower than a second threshold, the target priority of the data migration task is determined as the highest priority (also referred to herein as "first priority"). For example, in some cases, if the first space usage indicator indicates that the ratio of a storage space size available for allocation in the storage system to a total storage space size provided by the storage system is less than 15%, it indicates that the first space usage indicator is lower than the first threshold. For another example, in some cases, if the first space usage indicator indicates that a storage space size available for allocation in the storage system is insufficient to allocate a predetermined number of metadata storage units or a predetermined number of user data storage units, it indicates the first space usage indicator is lower than the first threshold. In some embodiments, the second threshold may be determined based on an alarm threshold of an insufficient metadata space set by the system. For example, assuming that the alarm threshold of the insufficient metadata space set by the system is 3 GB (that is, when the metadata free space is lower than 3 GB, the system generates an alarm), the second threshold may be set to be equal to or slightly higher than the alarm threshold, such as 4 GB. It should be understood that the first threshold and/or the second threshold may also be different values from the above examples or may be determined in other ways.

As shown in FIG. 3, in some embodiments, if the first space usage indicator is lower than the first threshold and the third space usage indicator is lower than a third threshold, the target priority of the data migration task is determined as the highest priority (that is, the first priority). In some embodiments, the third threshold may be determined based on a user data space expansion threshold set by the system. For example, assuming that the user data space expansion threshold set by the system is 60% (that is, when the occupancy ratio of a storage space allocated to the user data storage unit reaches 60%, the system needs to expand a new user data storage unit), the third threshold may be set to be equal to or slightly lower than the threshold, such as 55%.

It should be understood that the third threshold may also be a different value from the above example or may be determined in other ways.

As shown in FIG. 3, in some embodiments, if the first space usage indicator is lower than the first threshold, the second space usage indicator exceeds the second threshold, and the third space usage indicator exceeds the third threshold, the target priority of the data migration task is determined as a high priority (also referred to herein as "second priority," which is lower than the first priority). If the first space usage indicator exceeds the first threshold, the second space usage indicator is lower than the second threshold, and the third space usage indicator is lower than the third threshold, the target priority of the data migration task is determined as a medium priority (also referred to herein as "third priority," which is lower than the second priority).

As shown in FIG. 3, in some embodiments, if the first space usage indicator exceeds the first threshold and the second space usage indicator exceeds the second threshold, the target priority of the data migration task is determined as a low priority (also referred to herein as "fourth priority," which is lower than the third priority). If the first space usage indicator exceeds the first threshold and the third space usage indicator exceeds the third threshold, the target priority of the data migration task is determined as a low priority (that is, the fourth priority).

In this way, the embodiments of the present disclosure can dynamically determine a target priority of a data migration task based on different space usage indicators of the storage system.

At block 230, storage manager 120 determines whether the target priority is different from a current priority of the data migration task. If it is determined whether the target priority is different from the current priority of the data migration task (or in response thereto), storage manager 120 adjusts the current priority of the data migration task to the target priority at block 240.

At block 250, storage manager 120 determines system resources for the data migration task based on the target priority.

In some embodiments, determining the system resources for the data migration task includes determining at least one of the following: the number of processor cores used for the data migration task; the number of sub-tasks that can be executed in parallel in the data migration task(for example, each sub-task is used to migrate data in one disk slice); and whether to allow the storage system to use the processor cores for the data migration task to respond to other data access requests during the execution of the data migration task.

Figure 4:
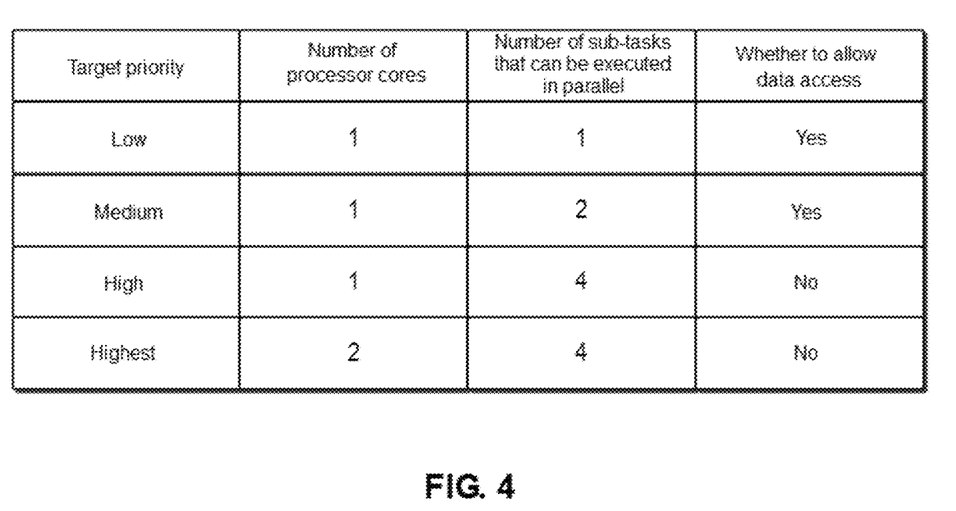
FIG. 4 shows a schematic diagram of determining system resources for a data migration task based on a target priority according to an embodiment of the present disclosure.

FIG. 4 shows a schematic diagram of determining system resources for a data migration task based on a target priority according to an embodiment of the present disclosure. It should be understood that the type and number of the system resources shown in FIG. 4 are illustrative only, and do not imply limitation to the scope of the present disclosure. In other embodiments, the type and number of the system resources allocated based on different target priorities may be different from the example shown in FIG. 4.

As shown in FIG. 4, if the target priority is a low priority (that is, the fourth priority), the number of processor cores used for the data migration tasks is 1, the number of sub-tasks that can be executed in parallel is 1 (that is, parallel migration of data in a plurality of disk slices is not allowed), and the storage system is allowed to use the processor cores for the data migration tasks to respond to other data access requests. If the target priority is a medium priority (that is, the third priority), the number of processor cores used for the data migration tasks is 1, the number of sub-tasks that can be executed in parallel is 2 (that is, parallel migration of data in two disk slices is allowed), and the storage system is allowed to use the processor cores for the data migration tasks to respond to other data access requests. If the target priority is a high priority (that is, the second priority), the number of processor cores used for the data migration tasks is 1, the number of sub-tasks that can be executed in parallel is 4 (that is, parallel migration of data in four disk slices is allowed), and the storage system is not allowed to use the processor cores for the data migration tasks to respond to other data access requests. If the target priority is the highest priority (that is, the first priority), the number of processor cores used for the data migration tasks is 2, the number of sub-tasks that can be executed in parallel is 4 (that is, parallel migration of data in four disk slices is allowed), and the storage system is not allowed to use the processor cores for the data migration tasks to respond to other data access requests.

In this way, the embodiments of the present disclosure can allocate corresponding system resources for a data migration task based on a target priority of the data migration task, thereby dynamically controlling its execution speed.

In some embodiments, method 200 may be executed in response to the data migration task being started. Additionally or alternatively, method 200 may be executed multiple times during the execution of the data migration task. For example, method 200 may be executed periodically during the execution of the data migration task, so as to realize the dynamic priority adjustment of the data migration task.

It can be seen from the above description that the embodiments of the present disclosure provide a solution for managing a storage system. In this solution, a plurality of space usage indicators of a storage system are determined. A target priority of a data migration task is determined based on the plurality of space usage indicators. If the target priority is different from a current priority of the data migration task, the current priority of the data migration task is adjusted to the target priority, and system resources for the data migration task are determined based on the target priority. In this way, the embodiments of the present disclosure can dynamically adjust the priority of a data migration task to meet the requirements of different scenarios, thereby increasing the execution speed of adjusting the data migration task as much as possible without affecting a normal data access operation.

Figure 5:
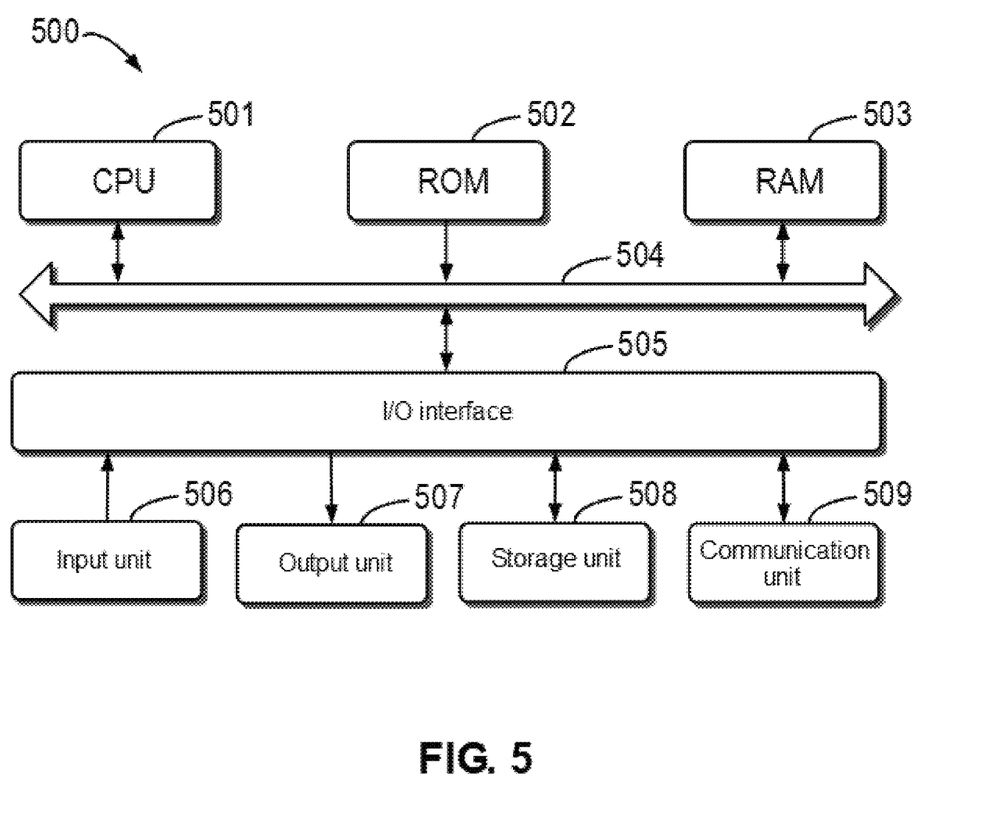
FIG. 5 shows a schematic block diagram of an example device that may be configured to implement an embodiment of the content of the present disclosure.

FIG. 5 shows a schematic block diagram of example device 500 that may be configured to implement an embodiment of the content of the present disclosure. For example, storage manager 120 as shown in FIG. 1 may be implemented by device 500. As shown in FIG. 5, device 500 includes Central Processing Unit (CPU) 501 that may execute various appropriate actions and processing in accordance with computer program instructions stored in read-only memory (ROM) 502 or computer program instructions loaded onto random access memory (RAM) 503 from storage unit 508. In RAM 503, various programs and data required for the operation of device 500 may also be stored. CPU 501, ROM 502, and RAM 503 are connected to each other through bus 504. I/O interface 505 is also connected to bus 504.

Multiple components in device 500 are connected to I/O interface 505, including: input unit 506, such as a keyboard and a mouse; output unit 507, such as various types of displays and speakers; storage unit 508, such as a magnetic disk and an optical disk; and communication unit 509, such as a network card, a modem, and a wireless communication transceiver. Communication unit 509 allows device 500 to exchange information/data with other devices via a computer network such as the Internet and/or various telecommunication networks.

Various processes and processing described above, for example, method 200, may be performed by processing unit 501. For example, in some embodiments, method 200 may be implemented as a computer software program that is tangibly included in a machine-readable medium such as storage unit 508. In some embodiments, some or all of the computer program may be loaded and/or installed onto device 500 via ROM 502 and/or communication unit 509. When the computer program is loaded into RAM 503 and executed by CPU 501, one or more actions of method 200 described above may be performed.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions for use by an instruction-executing device. For example, the computer-readable storage medium may be, but is not limited to, an electrical storage device, a magnetic storage device, an optical storage device, an electromagnetic storage device, a semiconductor storage device, or any suitable combination of the above. More specific examples (a non-exhaustive list) of the computer-readable storage medium include: a portable computer disk, a hard disk drive, a random access memory (RAM), a read-only memory (ROM), an erasable programmable read-only memory (EPROM or flash memory), a static random access memory (SRAM), a portable compact disk read-only memory (CD-ROM), a digital versatile disk (DVD), a memory stick, a floppy disk, a mechanical encoding device such as a punch card or a raised structure in a groove having instructions stored thereon, and any suitable combination thereof. Computer-readable storage media used herein are not to be interpreted as transient signals per se, such as radio waves or other freely propagating electromagnetic waves, electromagnetic waves propagating through waveguides or other transmission media (for example, light pulses through fiber optic cables), or electrical signals transmitted via electrical wires.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from the network and forwards the computer-readable program instructions for storage in the computer-readable storage medium in each computing/processing device.

Computer program instructions for performing the operations of the present disclosure may be assembly instructions, instruction set architecture (ISA) instructions, machine instructions, machine-related instructions, microcode, firmware instructions, state setting data, or source or object code written in any combination of one or more programming languages, wherein the programming languages include object-oriented programming languages, such as Smalltalk and C++, and conventional procedural programming languages, such as the "C" language or similar programming languages. Computer-readable program instructions may be executed entirely on a user's computer, partly on a user's computer, as a stand-alone software package, partly on a user's computer and partly on a remote computer, or entirely on a remote computer or a server. In the case involving a remote computer, the remote computer may be connected to a user's computer through any kind of network, including a local area network (LAN) or a wide area network (WAN), or it may be connected to an external computer (for example, connected through an Internet using an Internet service provider). In some embodiments, an electronic circuit, for example, a programmable logic circuit, a field programmable gate array (FPGA), or a programmable logic array (PLA), is personalized by utilizing state information of the computer-readable program instructions, wherein the electronic circuit may execute computer-readable program instructions so as to implement various aspects of the present disclosure.

Various aspects of the present disclosure are described herein with reference to flowcharts and/or block diagrams of the method, the apparatus (system), and the computer program product according to the embodiments of the present disclosure. It should be understood that each block in the flowcharts and/or block diagrams as well as a combination of blocks in the flowcharts and/or block diagrams may be implemented by using the computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means (e.g., specialized circuitry) for implementing the functions/actions specified in one or more blocks in the flowcharts and/or block diagrams. These computer-readable program instructions may also be stored in a computer-readable storage medium, and these instructions cause a computer, a programmable data processing apparatus, and/or other devices to work in a specific manner; and thus the computer-readable medium having stored instructions includes an article of manufacture including instructions that implement various aspects of the functions/actions specified in one or more blocks in the flowcharts and/or block diagrams.

The computer-readable program instructions may also be loaded onto a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flowcharts and/or block diagrams.

The flowcharts and block diagrams in the accompanying drawings illustrate the architectures, functions, and operations of possible implementations of the systems, methods, and computer program products according to various embodiments of the present disclosure. In this regard, each block in the flowcharts or block diagrams may represent a module, a program segment, or part of an instruction, the module, program segment, or part of an instruction including one or more executable instructions for implementing specified logical functions. In some alternative implementations, the functions marked in the blocks may also occur in an order different from that marked in the accompanying drawings. For example, two successive blocks may actually be executed in parallel substantially, or they may be executed in an opposite order sometimes, depending on the functions involved. It should be further noted that each block in the block diagrams and/or flowcharts as well as a combination of blocks in the block diagrams and/or flowcharts may be implemented by using a special hardware-based system for executing specified functions or actions or by a combination of special hardware and computer instructions.

Various embodiments of the present disclosure have been described above. The foregoing description is illustrative rather than exhaustive, and is not limited to the disclosed embodiments. Numerous modifications and alterations are apparent to those of ordinary skill in the art without departing from the scope and spirit of illustrated various embodiments. The selection of terms used herein is intended to best explain the principles and practical applications of the embodiments or the improvements to technologies on the market, or to enable other persons of ordinary skill in the art to understand the embodiments disclosed herein.

The invention claimed is:

1. A method for managing a storage system, comprising:
    determining a plurality of space usage indicators of a storage system, wherein the storage system comprises a plurality of disks, each disk is divided into a plurality of disk slices, and at least part of the disk slices in the plurality of disks are organized into a storage unit;
    determining a target priority of a data migration task based on the plurality of space usage indicators, wherein the data migration task is used to migrate data in a group of disk slices allocated to at least one storage unit to another group of disk slices;
    if the target priority is different from a current priority of the data migration task,
    adjusting the current priority of the data migration task to the target priority; and
    determining system resources for the data migration task based on the target priority;
    wherein the plurality of space usage indicators comprise:
    a first space usage indicator, indicating an available storage space size in the storage system that can be used to allocate new storage units;
    a second space usage indicator, indicating a free storage space size in a storage space allocated to a metadata storage unit; and
    a third space usage indicator, indicating a free storage space size in a storage space allocated to a user data storage unit; and
    wherein determining the target priority comprises:
    if the first space usage indicator is lower than a first threshold, the second space usage indicator exceeds a second threshold, and the third space usage indicator exceeds a third threshold, determining the target priority as a second priority lower than a first priority.

2. The method according to claim 1, wherein determining the plurality of space usage indicators comprises:
    determining the plurality of space usage indicators in response to the data migration task being started.

3. The method according to claim 1, wherein determining the target priority further comprises:
    if the first space usage indicator is lower than the first threshold and the second space usage indicator is lower than the second threshold, determining the target priority as the first priority; or
    if the first space usage indicator is lower than the first threshold and the third space usage indicator is lower than the third threshold, determining the target priority as the first priority.

4. The method according to claim 3, wherein determining the target priority further comprises:
    if the first space usage indicator exceeds the first threshold, the second space usage indicator is lower than the second threshold, and the third space usage indicator is lower than the third threshold, determining the target priority as a third priority lower than the second priority.

5. The method according to claim 4, wherein determining the target priority further comprises:
    if the first space usage indicator exceeds the first threshold and the second space usage indicator exceeds the second threshold, determining the target priority as a fourth priority lower than the third priority; or
    if the first space usage indicator exceeds the first threshold and the third space usage indicator exceeds the third threshold, determining the target priority as the fourth priority.

6. The method according to claim 1, wherein determining the system resources comprises determining at least one of the following:
    the number of processor cores used for the data migration task;
    the number of sub-tasks that can be executed in parallel in the data migration task, wherein each sub-task is used to migrate data in one disk slice; and
    whether to allow the storage system to use the processor cores for the data migration task to respond to other data access requests during the execution of the data migration task.

7. An electronic device, comprising:
    at least one processing unit; and
    at least one memory, the at least one memory being coupled to the at least one processing unit and storing instructions for execution by the at least one processing unit, wherein the instructions, when executed by the at least one processing unit, cause the electronic device to execute actions comprising:
    determining a plurality of space usage indicators of a storage system, wherein the storage system comprises a plurality of disks, each disk is divided into a plurality of disk slices, and at least part of the disk slices in the plurality of disks are organized into a storage unit;
    determining a target priority of a data migration task based on the plurality of space usage indicators, wherein the data migration task is used to migrate data in a group of disk slices allocated to at least one storage unit to another group of disk slices;
    if the target priority is different from a current priority of the data migration task,
    adjusting the current priority of the data migration task to the target priority; and
    determining system resources for the data migration task based on the target priority;
    wherein the plurality of space usage indicators comprise:
    a first space usage indicator, indicating an available storage space size in the storage system that can be used to allocate new storage units;

a second space usage indicator, indicating a free storage space size in a storage space allocated to a metadata storage unit; and a third space usage indicator, indicating a free storage space size in a storage space allocated to a user data storage unit; and wherein determining the target priority comprises:

if the first space usage indicator is lower than a first threshold, the second space usage indicator exceeds a second threshold, and the third space usage indicator exceeds a third threshold, determining the target priority as a second priority lower than a first priority.

8. The electronic device according to claim 7, wherein determining the plurality of space usage indicators comprises:

determining the plurality of space usage indicators in response to the data migration task being started.

9. The electronic device according to claim 7, wherein determining the target priority further comprises:

if the first space usage indicator is lower than the first threshold and the second space usage indicator is lower than the second threshold, determining the target priority as the first priority; or if the first space usage indicator is lower than the first threshold and the third space usage indicator is lower than the third threshold, determining the target priority as the first priority.

10. The electronic device according to claim 9, wherein determining the target priority further comprises:

if the first space usage indicator exceeds the first threshold, the second space usage indicator is lower than the second threshold, and the third space usage indicator is lower than the third threshold, determining the target priority as a third priority lower than the second priority.

11. The electronic device according to claim 10, wherein determining the target priority further comprises:

if the first space usage indicator exceeds the first threshold and the second space usage indicator exceeds the second threshold, determining the target priority as a fourth priority lower than the third priority; or if the first space usage indicator exceeds the first threshold and the third space usage indicator exceeds the third threshold, determining the target priority as the fourth priority.

12. The electronic device according to claim 7, wherein determining the system resources comprises determining at least one of the following:

the number of processor cores used for the data migration task;

the number of sub-tasks that can be executed in parallel in the data migration task, wherein each sub-task is used to migrate data in one disk slice; and whether to allow the storage system to use the processor cores for the data migration task to respond to other data access requests during the execution of the data migration task.

13. A computer program product having a non-transitory computer readable medium which stores a set of instructions to manage a storage system; the set of instructions, when carried out by computerized circuitry, causing the computerized circuitry to perform a method of:

determining a plurality of space usage indicators of a storage system, wherein the storage system comprises a plurality of disks, each disk is divided into a plurality of disk slices, and at least part of the disk slices in the plurality of disks are organized into a storage unit;

determining a target priority of a data migration task based on the plurality of space usage indicators, wherein the data migration task is used to migrate data in a group of disk slices allocated to at least one storage unit to another group of disk slices;

in response to the target priority being different from a current priority of the data migration task, adjusting the current priority of the data migration task to the target priority, and determining system resources for the data migration task based on the target priority;

wherein the plurality of space usage indicators comprise:

a first space usage indicator, indicating an available storage space size in the storage system that can be used to allocate new storage units;

a second space usage indicator, indicating a free storage space size in a storage space allocated to a metadata storage unit; and a third space usage indicator, indicating a free storage space size in a storage space allocated to a user data storage unit; and wherein determining the target priority comprises:

if the first space usage indicator is lower than a first threshold, the second space usage indicator exceeds a second threshold, and the third space usage indicator exceeds a third threshold, determining the target priority as a second priority lower than a first priority.

14. The method according to claim 1, wherein each disk of the plurality of disks has the same size.

15. The electronic device according to claim 7, wherein each disk of the plurality of disks has the same size.

16. The computer program product according to claim 13, wherein determining the plurality of space usage indicators comprises:

determining the plurality of space usage indicators in response to the data migration task being started.

17. The computer program product according to claim 13, wherein determining the target priority further comprises:

if the first space usage indicator is lower than the first threshold and the second space usage indicator is lower than the second threshold, determining the target priority as the first priority; or if the first space usage indicator is lower than the first threshold and the third space usage indicator is lower than the third threshold, determining the target priority as the first priority.

18. The computer program product according to claim 17, wherein determining the target priority further comprises:

if the first space usage indicator exceeds the first threshold, the second space usage indicator is lower than the second threshold, and the third space usage indicator is lower than the third threshold, determining the target priority as a third priority lower than the second priority.

19. The computer program product according to claim 18, wherein determining the target priority further comprises:

if the first space usage indicator exceeds the first threshold and the second space usage indicator exceeds the second threshold, determining the target priority as a fourth priority lower than the third priority; or if the first space usage indicator exceeds the first threshold and the third space usage indicator exceeds the third threshold, determining the target priority as the fourth priority.

20. The computer program product according to claim 13, wherein determining the system resources comprises determining at least one of the following:
- the number of processor cores used for the data migration task;
- the number of sub-tasks that can be executed in parallel in the data migration task, wherein each sub-task is used to migrate data in one disk slice; and
- whether to allow the storage system to use the processor cores for the data migration task to respond to other data access requests during the execution of the data migration task.

* * * * *